US012657199B2

(12) United States Patent (10) Patent No.: US 12,657,199 B2
Gentric et al. (45) Date of Patent: Jun. 16, 2026

(54) PROCESSING SEARCH REQUESTS

(71) Applicant: Amadeus S.A.S, Biot (FR)

(72) Inventors: Philippe Gentric, La Colle-sur-Loup
(FR); Julien Bianchi, Nice (FR);
Cyrille Cormier, Villeparisis (FR);
Nagesh Subramanya Kartheek,
Bengalore (IN)

(73) Assignee: AMADEUS S.A.S., Biot (FR)

( * ) Notice: Subject to any disclaimer, the term of this
patent is extended or adjusted under 35
U.S.C. 154(b) by 0 days.

(21) Appl. No.: 19/005,159

(22) Filed: Dec. 30, 2024

(65) Prior Publication Data

US 2025/0225138 A1 Jul. 10, 2025

(30) Foreign Application Priority Data

Jan. 5, 2024 (EP) .................................... 24315005

(51) Int. Cl.
| *G06F 16/00* | (2019.01) |
| *G06F 16/23* | (2019.01) |
| *G06F 16/248* | (2019.01) |

(52) U.S. Cl.
CPC ........ *G06F 16/248* (2019.01); *G06F 16/2365*
(2019.01)

(58) Field of Classification Search
CPC ........................... G06F 16/248; G06F 16/2365
USPC .................................................. 707/600–899
See application file for complete search history.

(56) References Cited

U.S. PATENT DOCUMENTS

| 7,979,457 | B1 | | 7/2011 | Garman | |
| 9,146,992 | B2 | * | 9/2015 | Zhou ..................... | G06F 16/951 |
| 9,189,645 | B2 | | 11/2015 | Borzycki et al. | |
| 9,697,253 | B2 | * | 7/2017 | Chidambaran ... | G06F 16/24552 |
| 9,876,873 | B1 | * | 1/2018 | Teague .............. | G06F 16/24552 |
| 10,268,704 | B1 | * | 4/2019 | Sanderson ........... | G06F 16/278 |
| 10,901,993 | B2 | | 1/2021 | Canis et al. | |
| 11,449,782 | B2 | | 9/2022 | Gentric | |
| 2008/0098041 | A1 | * | 4/2008 | Chidambaran ... | G06F 16/24539 |
| 2008/0167912 | A1 | | 7/2008 | de Marcken | |
| 2019/0173854 | A1 | | 6/2019 | Beck | |

(Continued)

OTHER PUBLICATIONS

Candela, Rosa, "Robust and Scalable Probabilistic Machine Learn-
ing Methods with Applications to the Airline Industry", Feb. 2021,
A doctoral dissertation submitted to Sorbonne University.

(Continued)

*Primary Examiner* — Michelle N Owyang
(74) *Attorney, Agent, or Firm* — PERRY + CURRIER
INC.

(57) ABSTRACT
The present disclosure relates to the processing of search
results in a distributed computing system, especially at a
user terminal. A user terminal comprises a memory storing
a probabilistic model to determine validities of search results
being outdated after passed time and storing rules to re-
compute the search results. The user terminal receives, in
response to at least one search request to at least one search
platform, at least one search result from the search platform.
The user terminal stores the received search results, and in
response to a trigger event, locally determines, based on a
probabilistic model, that the at least search result is likely
invalid. The user terminal locally re-computes the at least
one search result using the rules and presents the at least one
re-computed search result to the user.

19 Claims, 10 Drawing Sheets

(56)  References Cited

U.S. PATENT DOCUMENTS

2019/0303489 A1    10/2019  Truong et al.
2021/0073228 A1*   3/2021  Bikouo Njangang  ......................
                                                                      G01C 21/3617
2024/0086489 A1*   3/2024  Sachindran  ......... G06F 16/9574
2024/0232729 A1*   7/2024  Bouvrie  ................. G06N 20/00
2024/0370691 A1    11/2024  Devaux et al.

OTHER PUBLICATIONS

Tsekova, Desislava, "Secure Vault v1.0: Now available for all Secure Phone users", Apr. 10, 2018, securegroup.com, Retrieved from the Internet on Feb. 28, 2023 from URL: https://blog.securegroup.com/secure-vault-v1.0-0.

* cited by examiner

54 search result

201

80 rules search
platform

PROCESSING SEARCH REQUESTS

FIELD

The present disclosure generally related to the processing of search results in a distributed computing system, especially at user terminals.

BACKGROUND

Database-based query systems, where the query results are stored at least temporarily on the client, are known in the prior art. Also, the evolution of network technologies and distributed computing systems over the last decades has led to a significant increase of traffic load and server workload.

Attention is drawn to improving the operating mechanisms underlying the processing of database search results stored at a user terminal.

SUMMARY

According to a first aspect, a method for search result processing at a user terminal is provided. The user terminal comprises a memory storing a probabilistic model to determine validities of search results being outdated after passed time and storing rules to re-compute the search results. The method comprises, at the user terminal, in response to at least one search request to at least one search platform, receiving and storing at least one search result from the search platform; in response to a trigger event, locally determining, based on the probabilistic model, that the at least search one result is likely invalid; locally re-computing the at least one search result using the rules; and presenting the at least one re-computed search result to the user.

According to a second aspect, a user terminal is provided acting as a computing device for processing search results, the computing device being arranged to execute the methods as described herein.

Finally, a computer program is presented that comprises instructions which, when the program is executed by a computer, cause the computer to carry out the methods described herein.

Further refinements are set forth by the dependent claims.

These and other objects, embodiments and advantages will become readily apparent to those skilled in the art from the following detailed description of the embodiments having reference to the attached figures, the invention not being limited to any particular embodiments.

BRIEF DESCRIPTION OF THE FIGURES

Aspects and examples of the present disclosure are described with reference to the following figures, in which.

DETAILED DESCRIPTION

An issue coming along with storing data retrieved from a search or database system at a user terminal is to keep computed request results up-to-date in order to ensure that data maintained at the user terminal represent the current status of the corresponding data at the database from which requests by the user terminal have been responded. In case the underlying data at the database changes, the request results at the user terminal get outdated and the user terminal would maintain desynchronized data. Thus, strategies are sought how database search results stored at the user terminal can be kept up-to-date in a computational-wise efficient manner. On the other hand, sending, by the user terminal, requests to the (remote) database on a regular (time) scale results in an increase of the computational load at the database and of the amount of data to be transmitted, i. e. in an increase of the transmission load.

Further, with the climate change being imminent, resulting in a future scarcity of energy and goods, current straight-forward solutions and strategies, e.g. recomputing pre-computed search results such as the availability/price of consumer goods every couple of minutes, may become inacceptable in the future.

The present disclosure provides a method and a system for minimizing the computational load caused by frequent requests on (remote) database systems, by enabling a requesting unit such as a user terminal to perform part of the updating of the retrieved search results by itself, thereby reducing the number of requests sent to the (remote) database.

Figure 1:
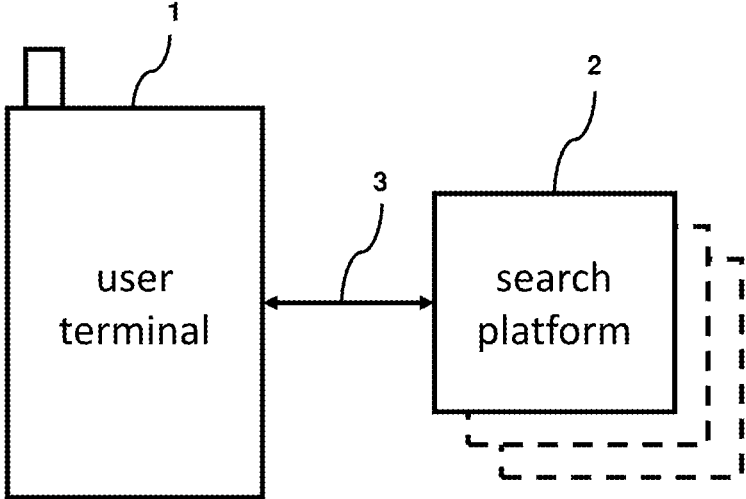
FIG. 1 illustrates a user terminal and a search platform as described herein.

FIG. 1 shows a computing system comprising a user terminal 1 and one or more search platforms 2.

User terminal 1 and the one or more search platforms 2 are located anywhere and are individual computing machines such as personal computers, mobile stations such as laptops or tablet computers, smartphones, and the like, as well as, in some embodiments, more powerful machines such as database application servers, distributed database systems respectively comprising multiple interconnected machines, data centers, etc. In some embodiments, the user terminal 1 might be a similar machine as the one or more search platforms 2, while, in other embodiments, the one or more search platforms 2 are more powerful than the user terminal 1. In one embodiment, user terminal 1 and/or the one or more search platforms 2 are data centers which may be worldwide distributed. The of one or more search platforms 2 may act as a server towards user terminal 1, processing and serving requests of user terminal 1. The of one or more search platforms 2 may be operated by providers such as Amazon, eBay, Google, vendors for products and services etc.

Figure 10:
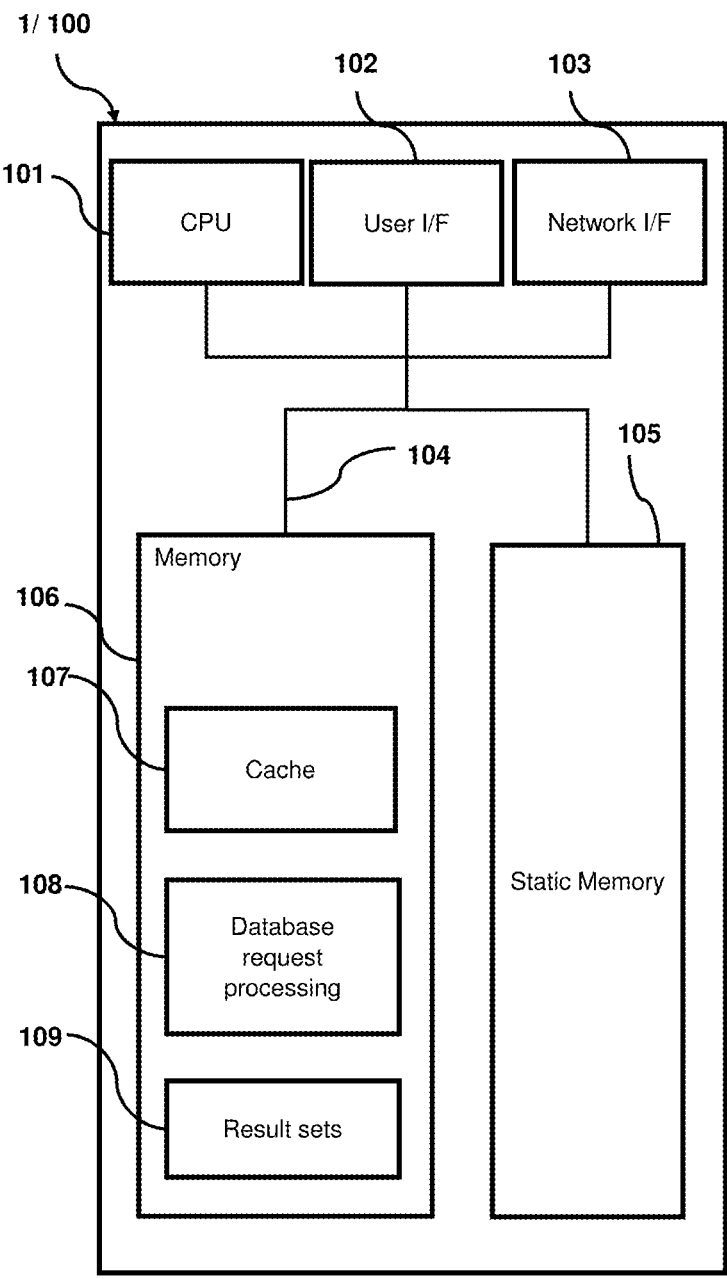
FIG. 10 depicts an internal structure of a computation engine which hosts a computer-implemented engine or a database.

User terminal 1 and/or the one or more search platforms 2 may be constituted of several hardware machines depending on performance requirements. User terminal 1 and/or the one or more search platforms 2 are embodied e.g. as stationary or mobile hardware machines comprising computing machines 100 as illustrated in FIG. 10 and/or as specialized systems such as embedded systems arranged for a particular technical purpose, and/or as software components running on a general or specialized computing hardware machine (such as a web server and web clients).

User terminal 1 and/or the one or more search platforms 2 are interconnected by the communication interfaces 3. Each of the interfaces 3 utilizes a wired or wireless Local Area Network (LAN) or a wireline or wireless Metropolitan Area Network (MAN) or a wire-line or wireless Wide Area Network (WAN) such as the Internet or a combination of the aforementioned network technologies and are implemented by any suitable communication and network protocols.

Search requests, which are requested from user terminal 1 over the communication interface 3 are received at the e.g., one or more search platforms 2. User terminal 1 and/or the one or more search platforms 2 may implement standardized communication protocols across the layers of the OSI reference model. Amongst others, the one or more search platforms 2 may employ initial processing mechanisms such as error recognitions and corrections, packet assembly, as well as determination whether a search request has been received. Invalid messages may be discarded by the one or more search platforms 2 for reasons of security and performance.

The search requests described herein may relate to any use case in the field of database, messaging and/or networking technology and others. Generally, search requests may be given by any data structure received at the e.g., one or more search platforms 2 by one or more network protocols and may cause the e.g., one or more search platforms 2 to process the request. Typically, a search request causes the e.g., one or more search platforms 2 to react towards the requestor, such as user terminal 1, with a response, but any types of request processing is encompassed herein, including request processing without any responses. Typically use cases of search requests are search platforms, messaging platforms, database systems, server systems, client/server-based request-response protocols. Search or database-related use cases encompassed herein are web server systems, web shops, expert systems, product and services search, shopping and booking systems, navigation systems, and so on.

The response data, such as search results, generated by the e.g., one or more search platforms 2 being sent to the user terminal 1 may comprise raw data, such as SQL-tables or tables in any other data format, search results dynamically computed at search request time, and/or already pre-computed response data. In any case, a part of the processing to transform the response data into result data providing information to be presented to the user is performed by the user terminal 1 on the response data received from the one or more search platforms 2 in response to the search request of the user terminal 1.

Figure 2:
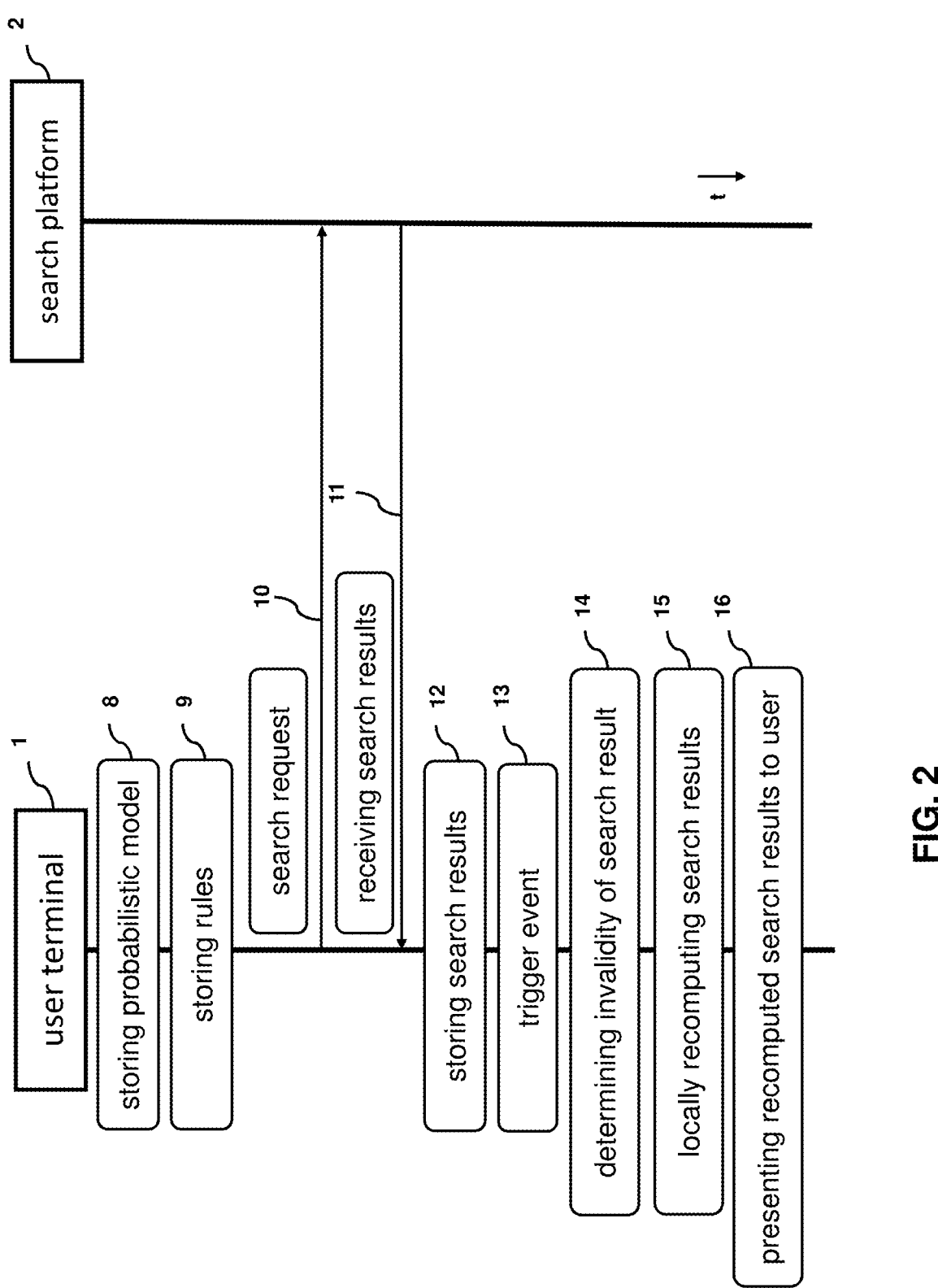
FIG. 2 depicts a sequence diagram for processing search results by a user terminal.

FIG. 2 shows a sequence diagram for processing search results by a user terminal 1, received from a search platform 2 in response to a search request received from the user terminal 1, according to some embodiments. The user terminal 1 comprises a memory (cf. FIG. 10) storing, in an activity 8, a probabilistic model to determine validities of search results being outdated after passed time and storing, in an activity 9, rules to re-compute the search results. According to FIG. 2, the user terminal 1 receives, in an activity 11, in response to at least one search request (activity 10) to at least one search platform 2 at least one search result from the search platform. In an activity 12, the user terminal 1 stores the received search results. In response to a trigger event 13, the user terminal 1 locally determines, in an activity 14, based on the probabilistic model, that the at least search result is likely invalid. In an activity 15, the user terminal 1 locally re-computes the at least one search result using the rules and presents, in an activity 16, the at least one re-computed search result to the user.

By the sequence as described and shown in FIG. 2, a particular way for a locally, nearly entirely independent invalidity-prediction and re-computation of search results at a local unit (such as a mobile user terminal 1 for example) is provided by using instructions, initial data and models provided by central data provider, such as search platform 2, provided before the beginning of a computation process at the local unit. The instructions, initial data and models are provided in a response to a client-based request. The interactions of the local unit, such as a mobile user terminal 1, with the search platform 2 of a central data provider is kept as minimal as possible. Therefore, the transmission load between the user terminal 1 and the search platform 2 as well as the computational load on the search platform 2 is reduced.

An invalidity-prediction and a re-computation of search-results may be possible even when there is no active network connection between the mobile unit, such as user terminal 1, and the central data provider, such as search platform 2. Hence, the present methodologies also facilitate offline operation of the user terminal 1 after search results reception 11.

The probabilistic model for the prediction of the invalidity of the search results may be utilized by machine learning techniques, such as federated machine learning, using input vectors as well as training vectors. Federated machine learning comprises of machine learning techniques that trains an algorithm via multiple independent sessions, with each session using its own dataset. Federated machine learning enables building a common, robust machine learning model without sharing data, thus addressing critical issues such as data privacy, data security, data access rights and access to heterogeneous data. A machine learning algorithm, such as a deep neural network, is trained on multiple local datasets contained in local nodes without exchanging data samples. Local models are trained on local data samples and parameters (e.g. the weights and biases of a deep neural network) between these local nodes are exchanged at some frequency to generate a global model shared by all nodes. The input vectors may be composed of the relevant data related to the search request. A new training vector may be computed each time when the invalidity is determined and the search result is re-computed. This e. g. enables to determine, whether the search result has been changed. Federated machine learning may be executed by a number of user terminals, such as mobile phones, including at least user terminal 1. The user terminal 1 may run local probabilistic models being managed by a central provider, which may operate search platform 2.

The rules determine the time-dependent change of the locally stored search results. Therefore, said change occurs in a deterministic way and furthermore, said change may be computed at independent local computing units separated from the search platform 2 and/or its providers one the rules are known to the independent local computing unit, such as user terminal 1.

Figure 3:
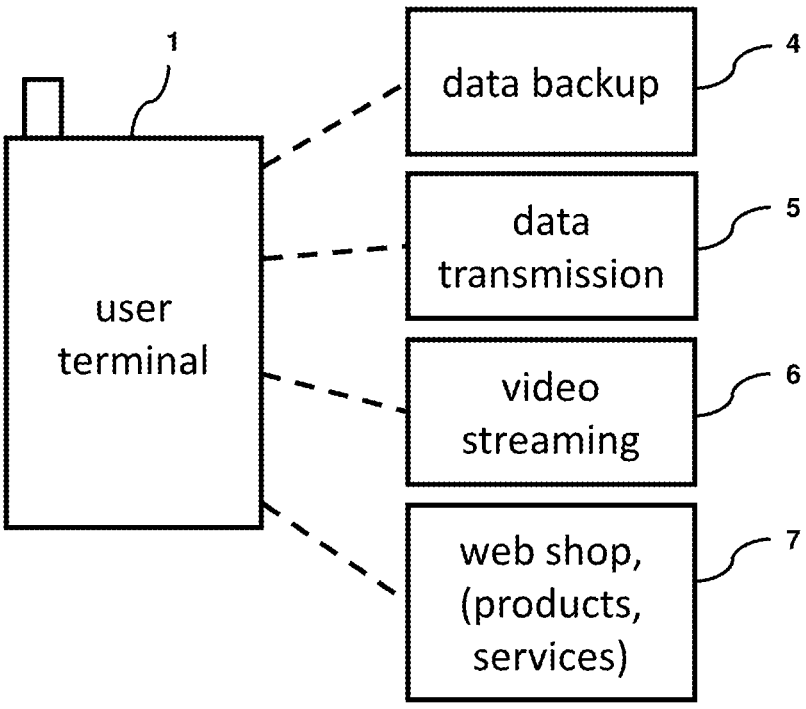
FIG. 3 is a schematic depiction of a worldwide distributed network of data centers, being an exemplar use case for the mechanisms described herein.

FIG. 3 shows a number of non-limiting practical use cases for the present methodologies. One of the use cases as shown in FIG. 3 refers to a request for data backup 4. A service for data backup 4 may provide a number of bandwidths for the transmission of the data to be backed-up to one or more backup-servers as well as a provision of disk-space for storing the data. Both service aspects feature Quality-of-Service levels, which may vary over time in a deterministic manner, as defined by the rules. As an example, during daytime, there is less bandwidth available for the transmission of data than during nighttime, and the prices for using the daytime bandwidth are higher than those for using the nighttime bandwidth. Furthermore, during daytime, more disk space is offered that during nighttime, also at higher prices than during nighttime. The amount of bandwidth and disk space offered at a corresponding price vary with day—and nighttime in a deterministic way, as e. g. defined by the rules, as shown in the following example (numbers are fictional, for illustrative purposes only):

TABLE 1

| | Offered bandwidths and disk spaces with their corresponding prices. | | | |
| --- | --- | --- | --- | --- |
| time | bandwidth in arbitrary units | price for bandwidth | disk space in arbitrary units | price for disk space |
| 00:00-06:00 a.m. | 10 | 50 $ | 1 000 000 | 20 $ |
| 06:00-12:00 a.m. | 1000 | 200 $ | 10 000 000 | 100 $ |
| 12:00-6:00 p.m. | 2000 | 300 $ | 10 000 000 | 150 $ |
| 06:00-12:00 p.m. | 500 | 100 $ | 1 000 000 | 30 $ |

The user of user-terminal 1 may send, from user terminal 1 to a search platform 2 of a data storage service provider, a request for data backup (activity 10 of FIG. 2). The request is sent e. g. at 08:00 a.m., i. e. in the morning. As a response from the search platform 2 (activity 11), an offer is sent to the user terminal 1 offering a bandwidth of 1000 at 200 $ and a disk space of 10 000 000 at 100 $. Together with the response, the user terminal 1 receives, from the provider, e. g also via the search platform 2, an application comprising a probabilistic model together with the corresponding rules for the local re-computation of the bandwidths, disk spaces offered at the corresponding prices during the various day—and nighttimes, and stores both, the model and the rules (activities 8 and 9 of FIG. 2) in the memories of user terminal 1.

With further reference to the example, the user may access the user terminal 1 e. g. at 01:00 p.m. in the early afternoon in order to receive an updated offer form the provider for data backup, herby causing a trigger event 13. Instead sending a new request to search engine 2, the user terminal 1 determines 14 that the offers sent with the response at 08:00 a.m. is invalid (due to the different time compared to the time of the initial request) and re-computes 15 locally the bandwidth, disk space and the corresponding prices valid for 01:00 p.m. The result re-computed by user terminal 1 using the rules and shown to the user then reads as follows: bandwidth of 2000 offered at 3000 $ and disk space of 10 000 000 offered at 150 $. At 07:00 p.m. the user again accesses the user terminal 1 for a renewed re-computation of an updated offer. User terminal 1 then again uses the probabilistic model and the rules for a local re-computation, and present to the user the following result: bandwidth of 500 offered at a price of 1000 $ and disk space of 1 000 000 at a price of 30 $. As already mentioned before, the re-computation is performed only at the user-terminal 1, without sending additional requests to search platform 2 or receiving any updated responses from search platform 2.

Now referring to another example, the user of user terminal 1 sends, in activity 10, at 06:00 p.m. in the early evening, to a provider of video streaming services (such as Netflix), a request for a movie, such as "Star Wars, Part 6". As a response to the request, the user receives, in activity 11, as a result an offer for a video stream of the aforementioned movie in 4K resolution. Said 4K resolution is offered between 06:00 p.m. and 12:00 p.m. and varies according to the rules in a deterministic manner over day—and nighttime, as shown below:

TABLE 2

| | Resolutions available over daytime and nighttime. | |
| --- | --- | --- |
| time | movie: | resolution |
| 00:00-06:00 a.m. | Star Wars 6 | DCI 2K |
| 06:00-12:00 a.m. | Star Wars 6 | VCD |
| 12:00-06:00 p.m. | Star Wars 6 | DVD |
| 06:00-12:00 p.m. | Star Wars 6 | 4K UHD |

Together with this response, the user terminal 1 also receives and installs from the streaming provider an application comprising a probabilistic model with the corresponding rules for a local computation, at the user terminal 1, of search results each time the user activates the application. At 01:00 a.m. the user accesses via user terminal 1 the installed application (thereby causing a trigger event 13). User terminal 1 determines 14, by the installed application, that the original offer of 06:00 p.m. is not valid anymore, and the user gets presented, e. g. via the display of the user terminal 1, a locally re-computed updated offer for a video stream of "Star Wars 6", however, at a reduced resolution of DCI 2K. The installed application has, after getting accessed by the user terminal 1 (trigger event 13), determined (activity 14) that the offer received with the response at 06:00 p.m. has become invalid at 01:00 a.m. and has locally re-computed (activity 15), the offer.

Receiving from the streaming provider an application comprising a probabilistic model with the corresponding rules may also be provided in conjunction with additional push services, which may be initiated by subscription and cancelled once the subscription is cancelled. For example, after the user has accepted an offer for "Star Wars 6", the streaming provider may provide, as a push service, an information to the user that offers for newly released movies, such as the movie "Star Wars 7", are available, including the corresponding probabilistic model and the rules.

With reference to a further example, the user terminal 1 is utilized for a product search/purchase request/response protocol with a web shop 7. The prices and the delivery times of the products may vary over time in a deterministic manner (e. g. when a product is more requested during holiday seasons). By using an application comprising a probabilistic model and corresponding rules deterministically defining the time-dependency of the prices and the delivery times of the products provided by the web shop, a user may via the user terminal 1 locally re-compute the prices and delivery times of specific products at various points in time. The prices and delivery times may vary depending on that products with certain features and properties are requested more often in comparison with other product features/properties. These dependencies may be reflected in statistical models which may form part of the probabilistic model received from the provider. The present methodologies as described within this disclosure are applicable to any retrievable data sets which change over time in a deterministic manner.

Figure 4:
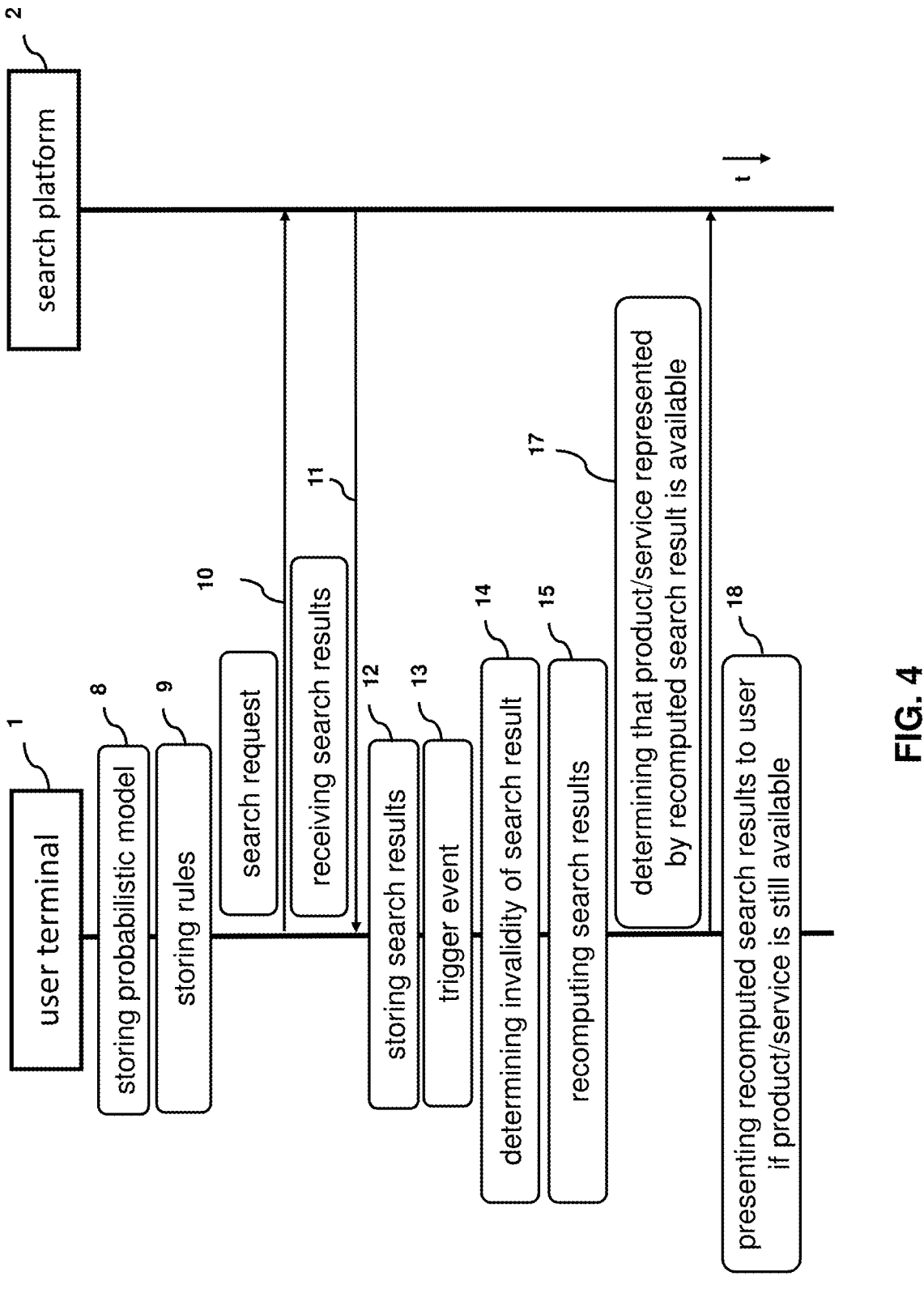
FIG. 4 depicts a further sequence diagram for processing search results by a user terminal as described herein.

In some embodiments, and as shown in FIG. 4, the method comprises, at the user terminal 1, determining, in an activity 17, by (newly) contacting the search platform 2, whether a product or service represented by the at least one search result is still available and presenting, in an activity 18, the at least one re-computed search result to the user if the product or service is still available. Further requests origination from user terminal 1 being directed to a service or products being no more available are therefore avoided.

Referring to the examples as described above and illustrated in FIG. 3, the user terminal 1 determines 17, triggered by the user in activity 13, when re-computing 15 the offer to receive a video stream of "Star Wars 6" at 01:00 a.m. whether the movie "Star Wars 6" is still available at all at the provider. Within this determination, the service provider (such as Netflix) is contacted by the user terminal 1 for an updated information relating to said movie. Nevertheless, the re-computation of the offer remains to be executed locally at the user terminal 1. If the determination 17 indicates that said movie is still being offered by the provider, the user terminal presents 18 to the user the locally re-computed offer, i. e. that the movie is currently available, i. e. at 01:00 p.m., at a reduced resolution of DCI 2K.

Figure 5:
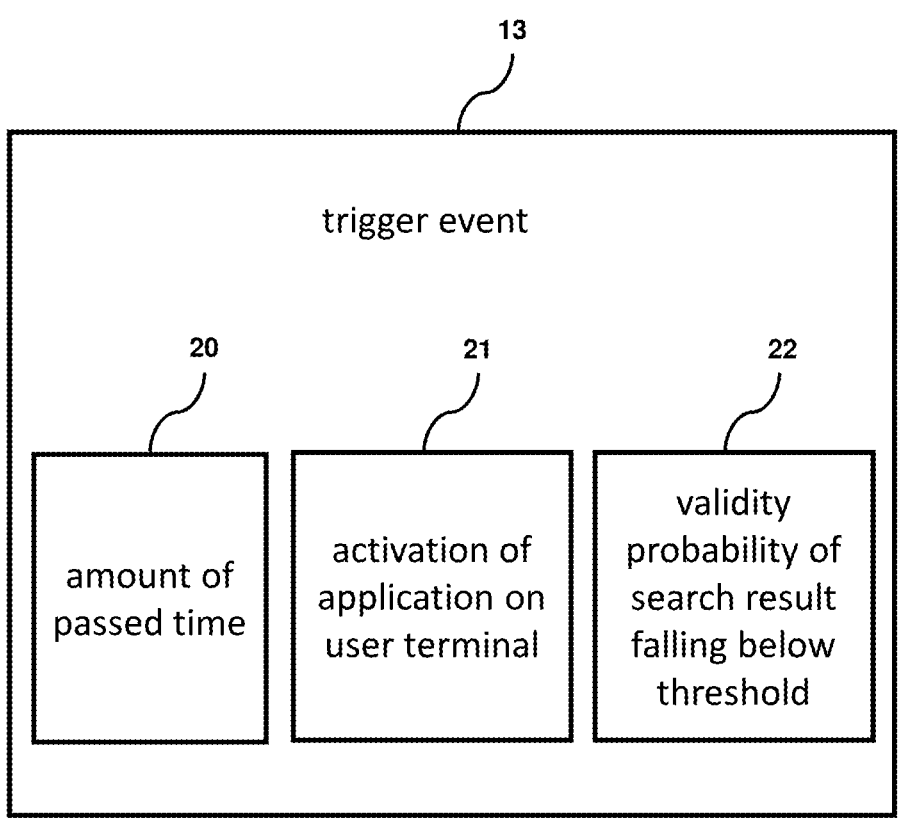
FIG. 5 illustrates trigger events as described herein.

In some embodiments, and as shown in FIG. 5, the trigger event 13 comprises one or more of: an amount of passed time 20, an activation 21 of an application running on the user terminal holding the at least one search result, a validity probability of the at least one search result falling below a threshold 22.

Referring again to the examples as depicted in FIG. 3 relating to the reception of video streams 6, the user of user terminal 1 triggers 13 the re-computation of the offer by activating 21, e. g. at 01:00 a.m., the application received and installed at user terminal 1 by the video stream provider. In another example, the application installed at the user terminal 1 determines 14 the validity of the offer autonomously and without any user interaction, after a certain time period has passed (such as 6 hours), together with the re-computation 15 of the video stream offer.

Figure 6:
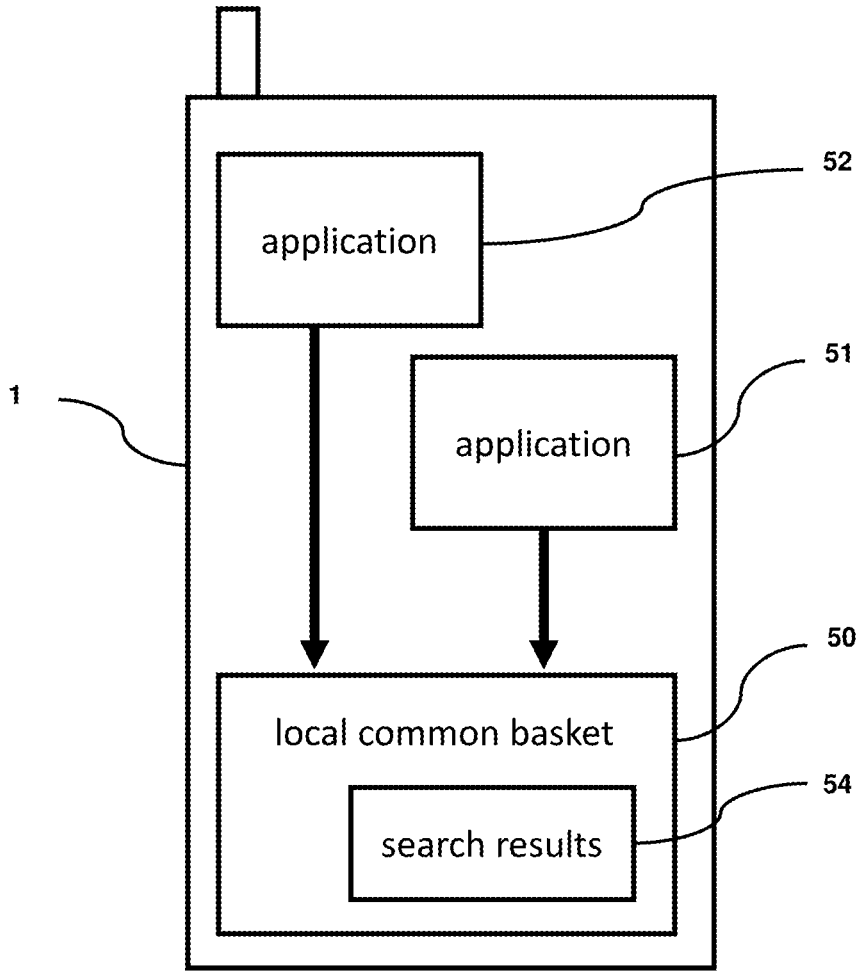
FIG. 6 shows a local common basket as described herein.
Figure 7:
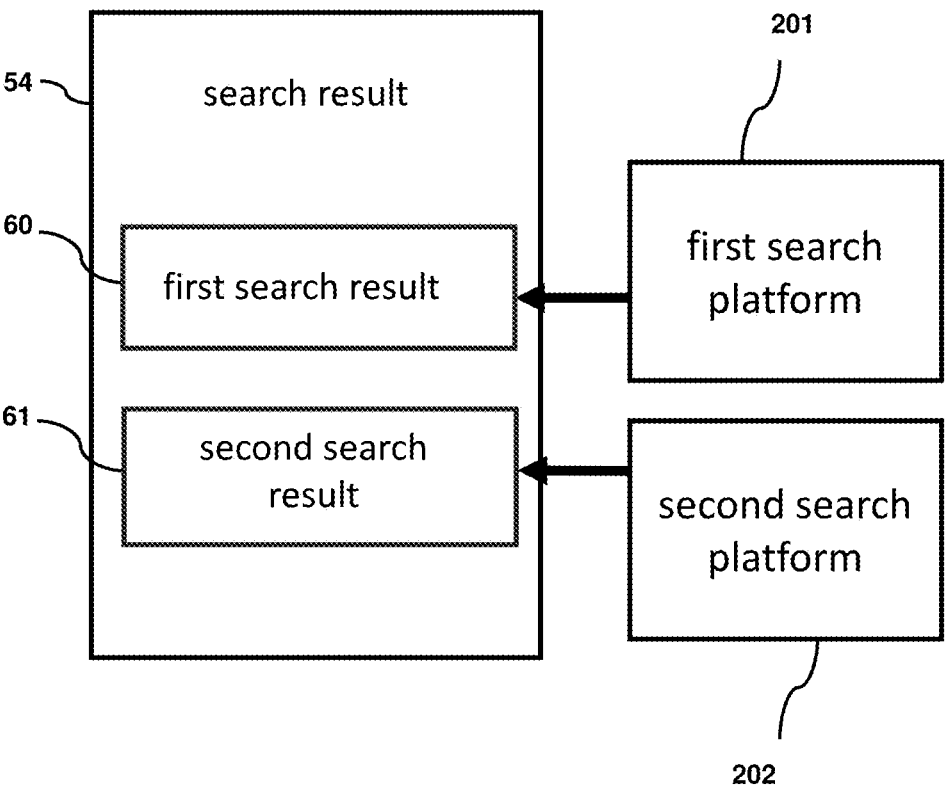
FIG. 7 depicts search results as described herein.

In some embodiments, as shown in FIG. 6, the at least one search result 54 is stored in a local common basket 50 of the user terminal 1 which is shared among multiple user applications 51, 52. The local common basket 50 may comprise a memory or parts of a memory of user terminal 1 which may be (only) accessible by the applications 51 and 52 installed at the user terminal 1, This ensures a local flexibility relating to the processing of search result 54 stored in the local common basket 50. As an example, application 51 may receive search results from search platform 2 being operated by an organisation being the partner organization operating a search platform, from which application 52 received search results. Although each one of the applications 51 and 52 normally prevent other applications from any access to the search results they have received, since the organizations which provide applications 51 and 51 are partner organizations, both applications 51 and 52 have access to the corresponding search results.

Storing search results 54 originating from different search platforms 2 or providers in a common local basket 50, with the different search results being processed by their associated applications 51 and 52, requires that said applications have to receive an indication which ones of search results 54 stored in the common local basket 54 are allowed to be processed and which rules have to be applied and also which search results 54 are prohibited from being accessed and processed. To assure, that a certain search result stored in the common local basket is processed by its associated applications through the execution of the allowable rules, the user terminal maintains, e. g. within the memories of user terminal 1, data records defining the associations between the various applications and the search results as well as the rules, which are allowed to be applied to a number of search results by a certain application, e. g. for the case in which the search results gets local re-computed. Said data records may be stored in a tabular format, and may be stored either in the common local basket together with the search results or in other parts of the memories of user terminal 1. Referring again to the examples as illustrated in FIG. 3, the search results relating to video streams 6 originating from vendors and the offers relating to data transmission and storage requests are stored in the common local basket 50. A table stored in the memories of user terminal 1 comprises rules defining that e. g. the application 51 provided by a video vendor has access to the search results relating to video stream offers and that application 52 provided by a data storage service provider has access to the search results relating to data storage offers. On the other hand, the first application 51 has not access to the data storage of the second application 52 and the second application 52 has not access to the data storage of the first application 51. In this way, the search results from both applications are maintained in a single local basket of the user terminal 1, but still maintained in a separate way to facilitate data consistency.

In some embodiments, the at least one search result 54 comprises multiple search results, namely at least one first search result 60 and at least one second search result 61, wherein the at least one first search result was retrieved from a first search platform 201 by a first user application of the multiple user applications and wherein the at least one second search result was retrieved from a second search platform 202 by a second user application of the multiple user applications. This ensures that response data originating from different search platforms can be processed within a single search result.

Referring again to the examples as presented in FIG. 3, the search result 60 may relate to a video stream offer retrieved from the first search platform 201 operated by a video streaming vendor, and the second search result 61 may relate to a product offer retrieved from the second search platform 202 operated by a product/services web shop.

Figure 8:
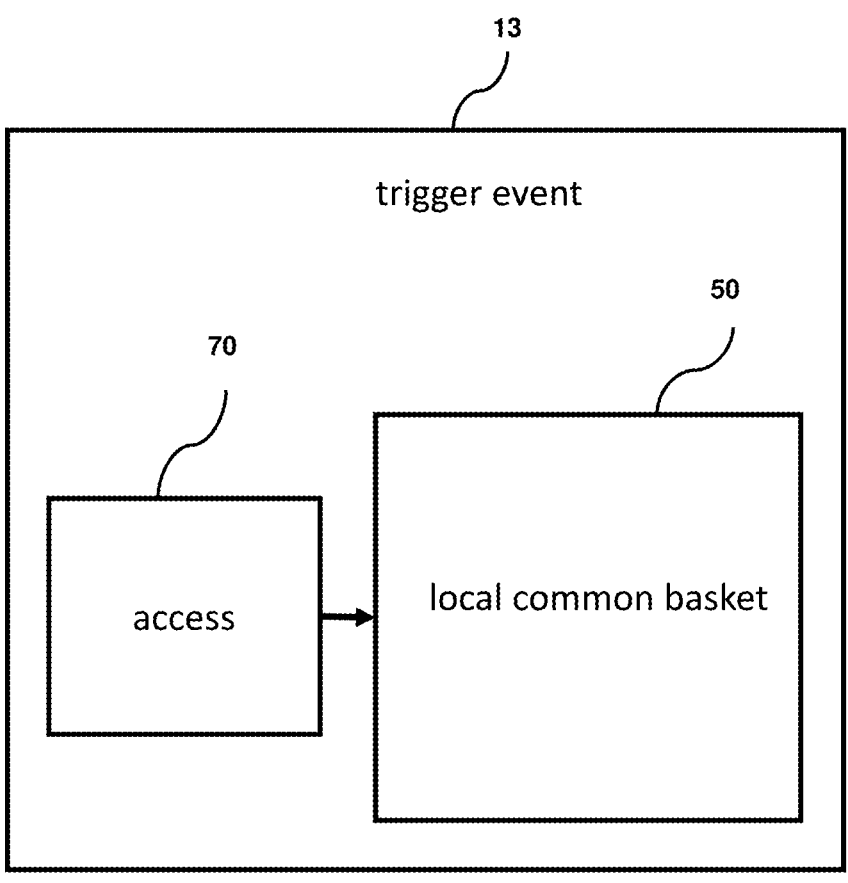
FIG. 8 shows a local common basket installed on a user terminal as described herein.

In some embodiments, as illustrated in FIG. 8, the trigger event 13 comprises an access 70 to the local common basket 50. The access may be caused by manual operation of the user of user terminal 1, or by another application accessing the local common basket 50. This ensures that updated search results 54 are processed upon/in response to accesses of the local common basket 50.

Referring again to the examples of FIG. 3, the user of user terminal 1 may access 70, as already described above, at 01:00 a.m. the common local basket 50 for an updated offer for a video stream 6 of "Star Wars 6". This causes a trigger event 13 for the subsequent re-computation of the corresponding offer for the video stream 6.

Figure 9:
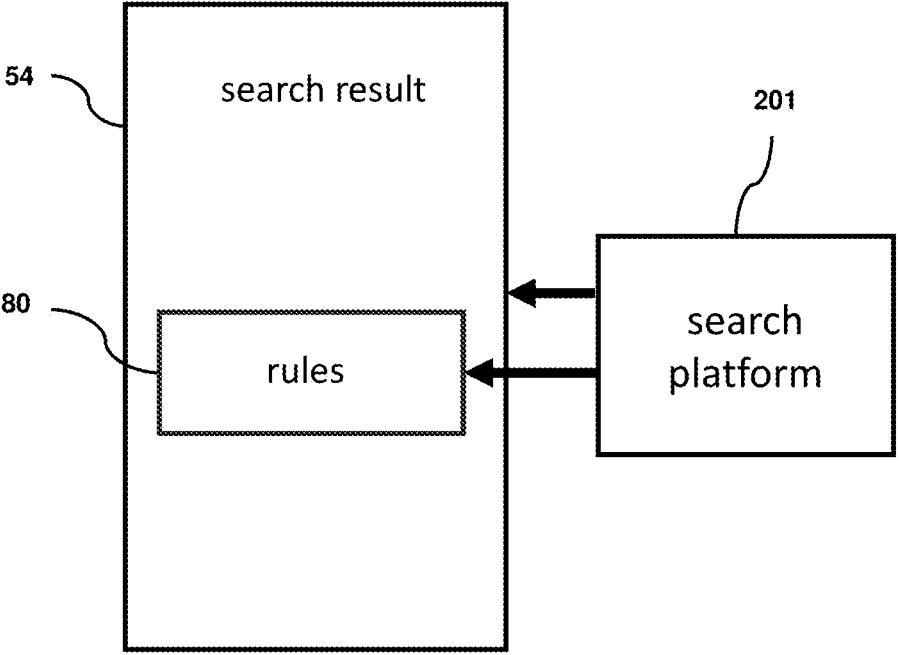
FIG. 9 illustrates the reception of the rules from the search platform.

In some embodiments and as illustrated in FIG. 9, receiving 11 and storing at least one search result from the search platform 1 comprises receiving the rules 80 from the search platform 2 and/or a computing platform operated by a provider of the search platform 2. The reception of the rules 80 and the probabilistic model may not be executed together with the reception of the search results, but could also be provided independently, e.g. if the underlying application 51 or 52 (e.g. a product purchase application or a travel application) is installed on the terminal. The rules 80 and the probabilistic model may form configuration data of the application 51 or 52.

The rules 80 and the probabilistic model may be updated at the user terminal 1 from time to time, either periodically or at undefined time intervals. The update may be executed as part of search requests, such as when receiving the response to a search request in activity 11 of FIG. 2, or asynchronously to the activities 10 and 11 of FIG. 2. The update may also be triggered by the search platform 2 when the rules 80 or the probabilistic model changes. The update may also be executed in the context of an update of the application 51 or 52.

Referring again to the examples as described above and illustrated in FIG. 3, user terminal 1 receives 11, as a response to the request 10, at 06:00 p.m. the video stream 6 offer for the movie "Star Wars 6" at a resolution of 4K UHD. Together with the offer, the user terminal 1 receives the rules for the re-computation of an updated offer at a later point in time. The rules define, as already described above, the resolutions available over the various periods of daytime and nighttime, as defined e. g. in table 2 of this disclosure. The rules may also further distinguish the offered resolution based on regions. As an example, countries belonging to the African Union may receive also a 4K UHD resolution for the movie "Star Wars 6" between 00:00 a.m. and 06:00 a.m.

The sequence diagram as shown in FIG. 2 may also be applied for purchasing products and services, e. g. via a web shop as shown in FIG. 3, such as requests for travel offers and flight connections. A user terminal 1 may send, in an activity 10, a number of requests for offers of flight connection from Paris to New York on 24 Dec. 2023. In activity 11, user terminal 1 may receive corresponding flight connections offered by e. g. Air France and Lufthansa. The offers comprise a price together with an indication concerning the invalidity of the prices. The user terminal 1 has also installed on his phone two applications 51 and 52 provided by Air France and Lufthansa, each application enabling a local calculation at the mobile phone of the invalidity of the price offers at future time points.

With further reference to the example, the user terminal 1 may receive, on the 1 Dec. 2023, within activity 11, an offer from Lufthansa for a flight connection from Paris to New York on 24 Dec. 2023 for 1500 €. Further, also within activity 11, the user may receive on offer from Air France for a corresponding flight connection for 1300 €. Both offers are stored, within activity 12, as search results 54 at the local common basket 50. On 2 Dec. 2023, the local common basket 50 installed at user terminal 1 is accessed, thereby causing a trigger event 13. In response to the trigger event, application 52, provided by Lufthansa, determines (activity 14) the invalidity of the price of 1500 € which has been indicated to the user the day before, i.e. the 1 Dec. 2023. The determination yielded that the price of 1500 € is not valid anymore. Application 52 re-computes in activity 15, based on the instructions, initial data and models that have been provided by Lufthansa to user terminal 1 together with application 52, a current value for price of the aforementioned flight connection on 24 Dec. 2023. Said re-computation, as executed by application 52, results in an updated price of 1650 €. Said re-computation is executed exclusively at user terminal 1, without requesting any resources, such as computational resources or functional or content data, form any external unit, such as e. g. a server provided by Lufthansa. Application 52 presents, in activity 16, the re-computed price of 1650 € to the user of the user terminal 1, e. g. through a display software application of application 2 by using e. g. the screen of user terminal 1.

In a similar way, the validity of the price of the offer by Air France may be determined and the re-computation of said price may be executed by e. g. application 51.

Storing the data, such as fares and rules at the user terminal 1 and using the central processing unit (CPU) of the user terminal 1 to perform e. g. the price computation results in lower computational costs for airlines such as Lufthansa and Air France. Furthermore, the environmental impact of a smartphone may be smaller than a server.

FIG. 10 is a diagrammatic representation of the internal components of a computing machine 100 implementing the functionality of user terminal 1 and search platform 2. The computing machine 100 includes a set of instructions to cause the computing machine 100 to perform any of the methodologies discussed herein when executed by the computing machine 100. The computing machine 100 includes at least one processor 101, a main memory 106 and a network interface device 103 which communicate with each other via a bus 104. Optionally, the computing machine 100 may further include a static memory 105 and a disk-drive unit. A display, an alpha-numeric input device and a cursor control device may be provided as examples of user interface 102. The network interface device 103 connects the computing machine 100 implementing the user terminal 1 with the search platform 2.

The mechanisms as described herein refer to any sort of search results, independent of its content, which are stored locally at the user terminal 1 and whose original version may vary over time and may become invalid and has to be updated according to certain rules.

Computing machine 100 includes a memory 106 such as main memory, random access memory (RAM) and/or any further volatile memory. The memory 106 may store temporary data and program data 107 to facilitate the functionality of the computing device 1, including program data to realize the receiving 10, from the user terminal 1, of a plurality of search requests.

In addition, the memory 106 may store temporary data and program data 107 to realize, by the computing platform 1, the receiving, at the user terminal 1, in an activity 11, in response to at least one search request (activity 10) to at least one search platform 2, the receiving at least one search result from the search platform, and further, in an activity 12, at the user terminal 1, the storing the received search results. In response to a trigger event 13, the memory 106 realizes by the computing platform 1, at the user terminal 1, the locally determining, in an activity 14, based on the probabilistic model, that the at least search result is likely invalid, as well as, in an activity 15, at the user terminal 1, the locally re-computing of the at least one search result using the rules and the presenting, in an activity 16, of the at least one re-computed search result to the user.

A set of computer-executable instructions embodying any one, or all, of the methodologies described herein, resides completely, or at least partially, in or on a machine-readable storage medium, e.g., in the static memory 105 or, when loaded and being executed, in the main memory 106. For example, the instructions may include software processes implementing the search result processing functionality of the computing platform 1. The instructions may further be transmitted or received as a propagated signal via the Internet through the network interface device 103 or via the user interface 102. Communication within computing machine 100 is performed via a bus 104. Basic operation of the computing machine 100 is controlled by an operating system which is also located in the memory 106, the at least one processor 101 and/or the static memory 105.

In general, the routines executed to implement the embodiments, whether implemented as part of an operating system or a specific application, component, program, object, module or sequence of instructions, or even a subset thereof, may be referred to herein as "computer program code" or simply "program code". Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

In certain alternative embodiments, the functions and/or acts specified in the flowcharts, sequence diagrams, and/or block diagrams may be re-ordered, processed serially, and/or processed concurrently. Moreover, any of the flowcharts, sequence diagrams, and/or block diagrams may include more or fewer blocks than those illustrated consistent with embodiments and examples.

The terminology used herein is for the purpose of describing particular embodiments and examples, and is not intended to be limiting. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While a description of various embodiments has illustrated all of the inventions and while these embodiments have been described in considerable detail, it is not the intention to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details.

The invention claimed is:

1. A method comprising:

providing, from a user terminal, to at least one search platform, at least one search request;

in response to the at least one search request to the at least one search platform, receiving, at the user terminal, from the at least one search platform: a probabilistic model to determine validities of search results being outdated after passed time; and rules to re-compute the search results, wherein the probabilistic model and the rules are received together from the at least one search platform;

in response to the at least one search request to the at least one search platform, receiving, at the user terminal, and storing, via the user terminal, at least one search result from the at least one search platform;

in response to a trigger event, locally determining, at the user terminal, based on the probabilistic model, that the at least one search result is likely invalid;

locally re-computing, at the user terminal, the at least one search result using the rules; and presenting, via the user terminal, the at least one re-computed search result to a user.

2. The method of claim 1, further comprising, at the user terminal:

determining, by contacting the at least one search platform, whether a product or service represented by the at least one search result is still available;

presenting the at least one re-computed search result to the user if the product or service is still available.

3. The method of claim 1, wherein the trigger event comprises one or more of: an amount of passed time, an activation of an application running on the user terminal holding the at least one search result, a validity probability of the at least one search result falling below a threshold.

4. The method of claim 1, wherein the at least one search result is stored in a local common basket of the user terminal which is shared among multiple user applications.

5. The method of claim 4, wherein the at least one search result comprises at least one first search result and at least one second search result, wherein the at least one first search result was retrieved from a first search platform by a first user application of the multiple user applications and wherein the at least one second search result was retrieved from a second search platform by a second user application of the multiple user applications.

6. The method of claim 4, where the trigger event comprises, the user accessing the local common basket.

7. The method of claim 1, wherein receiving and storing at least one search result from the at least one search platform comprises receiving the rules from one or more of the search platform and a computing platform operated by a provider of the search platform.

8. A computer program product comprising a non-transitory computer-readable medium storing program code which executes the method of claim 1 when run by a computer.

9. The method of claim 2, wherein the trigger event comprises one or more of: an amount of passed time, an activation of an application running on the user terminal holding the at least one search result, a validity probability of the at least one search result falling below a threshold.

10. The method of claim 5, where the trigger event comprises, the user accessing the local common basket.

11. A user terminal acting as a computing device for processing requests, the user terminal being arranged to execute a method for search result processing, the user terminal comprising:

a processor; and a computer-readable storage medium storing program instructions that, when executed by the processor, causes the processor to perform a set of operations comprising:

providing, to at least one search platform, at least one search request;

in response to the at least one search request to the at least one search platform, receiving from the at least one search platform: the probabilistic model to determine validities of search results being outdated after passed time; and rules to re-compute the search results, wherein the probabilistic model and the rules are received together from the at least one search platform;

in response to at least one search request to at least one search platform, receiving and storing at least one search result from the search platform;

in response to a trigger event, locally determining, based on the probabilistic model, that the at least one search result is likely invalid;

locally re-computing the at least one search result using the rules; and presenting the at least one re-computed search result to a user.

12. The user terminal of claim 11, wherein the set of operations further comprises:

determining, by contacting the at least one search platform, whether a product or service represented by the at least one search result is still available;

presenting the at least one re-computed search result to the user if the product or service is still available.

13. The user terminal of claim 12, wherein the trigger event comprises one or more of: an amount of passed time, an activation of an application running on the user terminal holding the at least one search result, a validity probability of the at least one search result falling below a threshold.

14. The user terminal of claim 11, wherein the trigger event comprises one or more of: an amount of passed time, an activation of an application running on the user terminal holding the at least one search result, a validity probability of the at least one search result falling below a threshold.

15. The user terminal of claim 11, wherein the at least one search result is stored in a local common basket of the user terminal which is shared among multiple user applications.

16. The user terminal of claim 15, where the trigger event comprises, the user accessing the local common basket.

17. The user terminal of claim 15, wherein the at least one search result comprises at least one first search result and at least one second search result, wherein the at least one first search result was retrieved from a first search platform by a first user application of the multiple user applications and wherein the at least one second search result was retrieved from a second search platform by a second user application of the multiple user applications.

18. The user terminal of claim 17, where the trigger event comprises, the user accessing the local common basket.

19. The user terminal of claim 11, wherein receiving and storing at least one search result from the at least one search platform comprises receiving the rules from one or more of the at least one search platform and a computing platform operated by a provider of the at least one search platform.

* * * * *